May 29, 1951 — W. P. ALBERT ET AL — 2,554,549
RECORDER FAILURE INDICATOR
Filed Oct. 29, 1948 — 2 Sheets-Sheet 1

INVENTORS: W. P. ALBERT
H. W. GOFF
BY
ATTORNEY

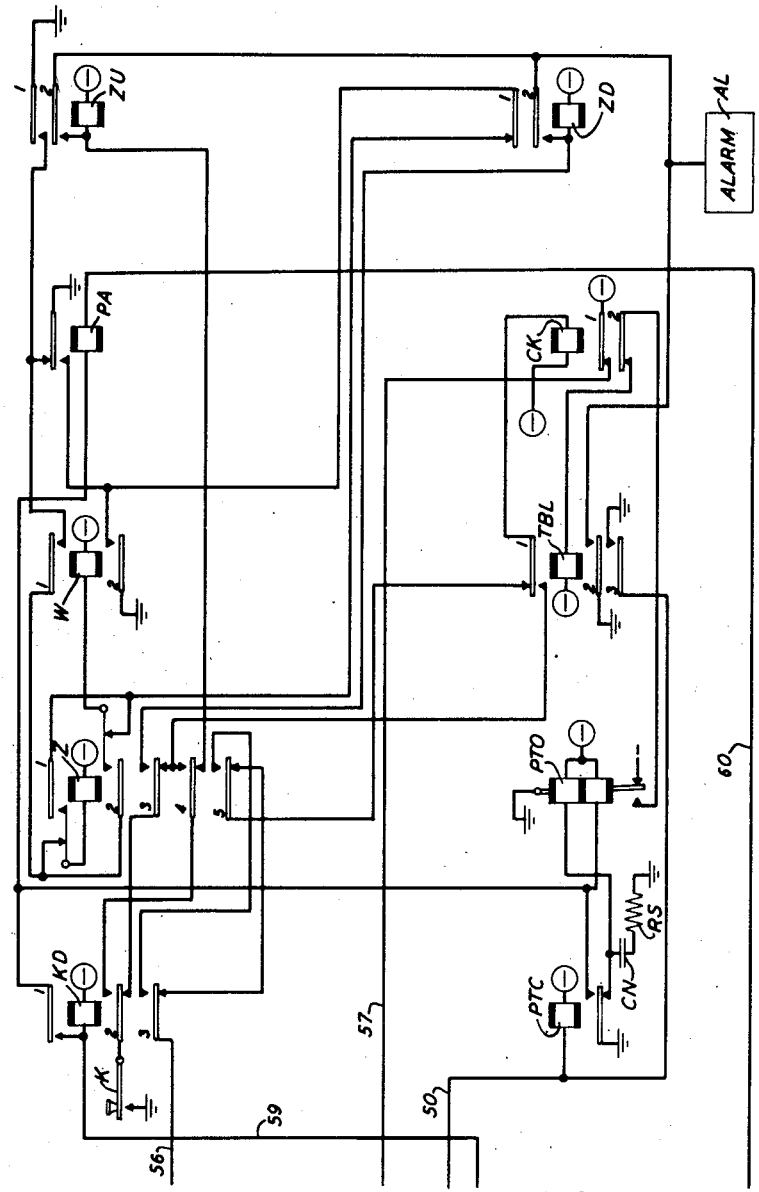

Patented May 29, 1951

2,554,549

UNITED STATES PATENT OFFICE 2,554,549

RECORDER FAILURE INDICATOR

Walter P. Albert, Madison, N. J., and Harold W. Goff, Manhasset, N. Y., assignors to Bell Telephone Laboratories, Incorporated, New York, N. Y., a corporation of New York Application October 29, 1948, Serial No. 57,395

7 Claims. (Cl. 177—311)

This invention relates to recording devices and more particularly to the record-feeding means of such devices.

In many recording devices, such as, for example, the recorder disclosed in the copending application of W. W. Carpenter, Serial No. 588,-401, filed April 14, 1945, records are made by successive lines of impressions across a wide paper tape carried by a drum or platen roller. The impressions in a line are produced by magnetically operated punches and, after the punches are released, the drum is partly rotated by a magnet to advance the tape to a position for punching another line with the same punches. In operation these movements occur in rapid succession. By well-known means, the paper tape may be caused to engage the drum so that, if the drum steps, the tape will be surely advanced but, if the magnet fails to step the drum in the interval between successive impressions, two lines of impressions will be superimposed on the same portion of the tape. Not only is one line of the record thus rendered illegible, but the information which should have been recorded on the succeeding line is lost. It is very desirable, therefore, that means be provided to give an immediate and automatic indication of any failure of the record feed to advance the tape. However, in order to operate the recorder at a high speed, the rotative steps of the drum must be rapid and any device which imposes a load on the drum increases its chances of failure to step.

The present invention discloses a novel means for checking the stepping of the drum and other operations of the recorder as each line is recorded and arresting further recording operation if malfunctioning occurs. Furthermore, the invention is of such a character that it imposes no load on the drum that would tend to interfere with its normal movements.

A feature of the invention is a novel means for restoring the recorder to normal operation after a malfunction.

The invention and its mode of operation will be more clearly understood from the accompanying description, the appended claims and the drawings, in which:

Fig. 2 shows the remainder of the checking circuit. Fig. 2 should be placed to the right of Fig. 1 to disclose the invention.

Figure 1:
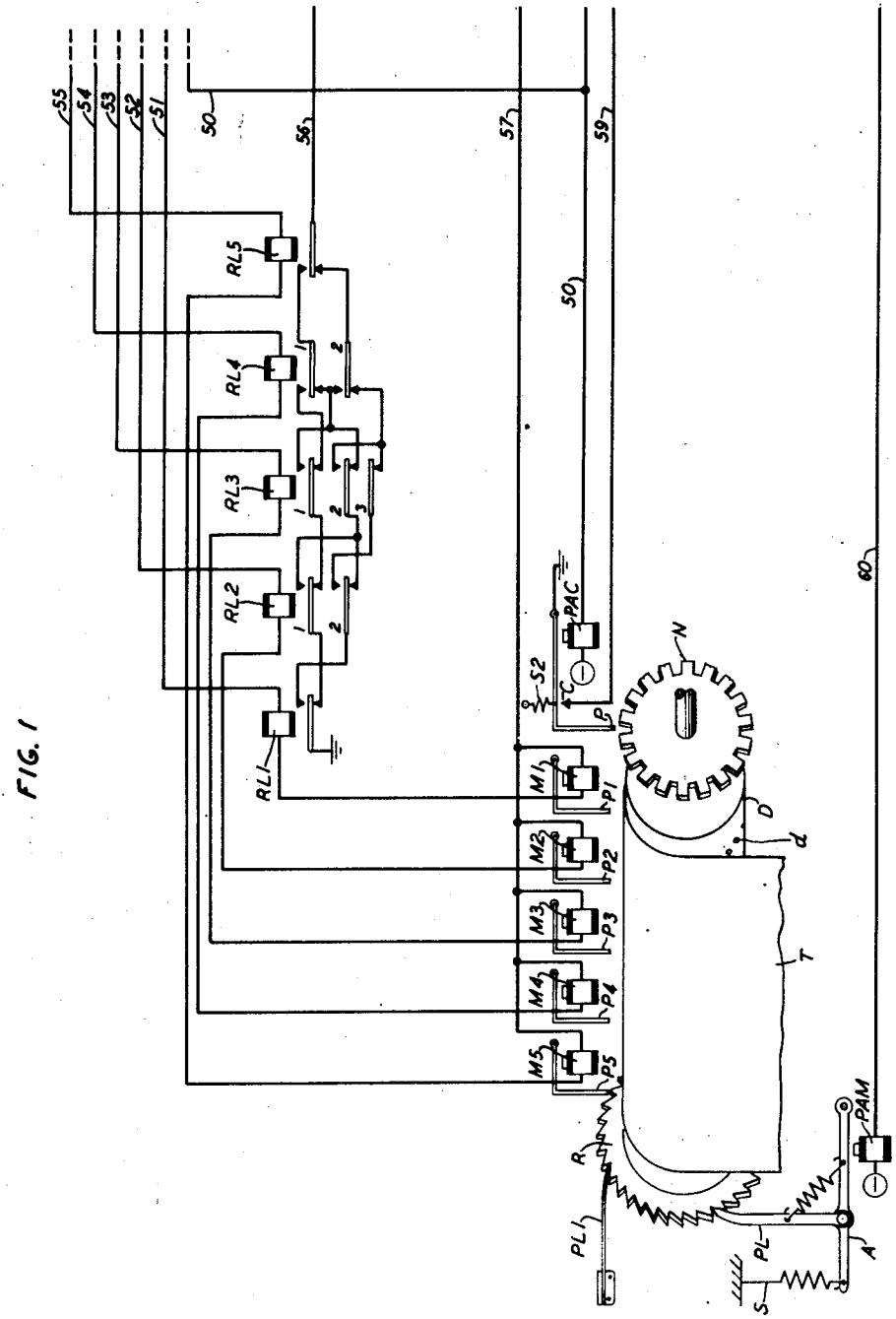
Fig. 1 shows the recording mechanism and a portion of the checking circuit.

In Fig. 1, T is the paper tape in which the impressions are made by the punches PI—P5 controlled by magnets MI—M5, respectively. The tape T is carried and advanced by the drum D. In practice, it is found convenient to form the drum D with depressions $d$ in rows corresponding to the lines of impressions to be made and spaced to correspond with the punches PI—P5. When the tape is impressed by the punches, the impressed portions thereof engage the depressions $d$ so that, when the drum D is rotated, the tape T is surely advanced. Other means of assuring the advance of the tape T when the drum D is rotated may, of course, be used.

Mounted on one end of the drum D is a ratchet R engaged by a pawl PL on the armature A of the paper advance magnet PAM. When said magnet is energized, attracting its armature A, the pawl PL engages a tooth of the ratchet R and when said magnet is released, the spring S lifts the armature A and pawl PL, turning the ratchet R and, thereby, the drum D, which advances the tape T to the next recording position. Reference may be had to the above-mentioned copending application W. W. Carpenter for a more complete description of a recording device of this kind.

According to the present invention, a notched disc N is rigidly mounted on the shaft of the drum D and turns with said drum. A feeler pin P is arranged in conjunction with said disc to be operated by magnet PAC. When said magnet is operated, the pin P is drawn down to contact the disc N, which has a notch at the position of every other tooth of the ratchet R. When the tape T is positioned by drum D for punching one line of impressions, the pin P, when drawn down by magnet PAC, strikes the periphery of disc N and does not close the contacts C, but when the tape T is positioned for punching the next line of impressions, the pin P when drawn down by magnet PAC, falls into a notch of the disc N and closes contacts C. If magnet PAC is energized at each line of impressions in the tape T, contacts C are, therefore, normally closed at every other line. If, however, the drum D fails to rotate, this sequence will be interrupted and contacts C will be closed or open for two or more successive operations of magnet PAC.

The electrical circuit shown in Fig. 2 responds to or "counts" the closure of contacts C. As will be apparent from the description which follows, this circuit is so arranged that the operation or the non-operation at the same time of relays KD and Z indicates correct movement of the drum D, but the operation of either relay KD or Z when the other is not operated, indicates incorrect operation of the drum D. In case of such incorrect operation, the normal sequence of operation of relays KD and Z with respect to contacts C is disturbed and relays ZD and ZU are provided to restore the normal sequence when the trouble is cleared and the recorder put back into normal operation.

The impressions made in the tape T by the punches P1 to P5 form a code, each character of the code being represented by two impressions. Two and only two of the punch magnets M1—M5 should, therefore, be operated at one time.

The windings of relays RL1—RL5 are connected in series with the windings of the punch magnets M1—M5, respectively, so that, when any of the punch magnets M1—M5 are energized, the associated relays are also energized. The contacts of relays RL1—RL5 are so connected, as shown in Fig. 1, that when two of said relays are operated according to the code, a circuit is completed from conductor 56 through said contacts to ground, but if more or less than two of relays RL1—RL5 are operated, this circuit is not completed. Relay CK is a checking relay, the operation of which indicates that two and only two of the punch magnets M1—M5 are energized to record a line of impressions in tape T and that the drum D has stepped from its position when recording the previous line. Relay TBL is a trouble relay which, by its operation, indicates that the recorder has functioned incorrectly. Relay PTO is a timing relay for timing the circuit operations.

Assuming, now, that it is desired to record a line of impressions in tape T, a suitable combination of two in the group of conductors 51—55, and also conductor 50, should be grounded by any suitable means. By the grounding of a combination of conductors 51—55, the punch magnets and associated relays corresponding to the combination of conductors grounded are energized, the punch magnets actuating a combination of the punches P1—P5 to record the desired impressions in tape T. For example, if conductor 51 is grounded, punch magnet M1 and relay RL1 are energized over a circuit extending from battery through No. 1 contacts of relay CK, conductor 57, the winding of punch magnet M1, and the winding of relay RL1 to ground on conductor 51. Punch magnet M1 actuates punch P1 to impress the tape T.

By the grounding of conductor 50, relay PTC and magnet PAC are operated over obvious circuits. The paper advance magnet PAM and relay PA then operate over a circuit extending from battery through the winding of magnet PAM, conductor 60, the winding of relay PA, and front contacts of relay PTC to ground. The paper advance magnet PAM retracts pawl PL but does not move the drum D which is held stationary by the spring pawl PL1. Magnet PAC, in operating, draws the feeler pin P against the disc N. Assuming that said disc is in such a position that the feeler pin P strikes the periphery of said disc, contacts C do not close.

The operation of relay PA completes a circuit from battery through the winding of relay W, No. 2 normal contacts of relay Z, No. 1 contacts of relay ZD, and front contacts of relay PA to ground, over which relay W operates, locking up through its own No. 2 contacts to ground. If two and only two of the punch magnets M1—M5 are energized and their associated relays thereby operated, relay CK operates. For example, if punch magnets M1 and M2 are energized and relays RL1 and RL2 are operated, relay CK operates over a circuit extending from battery through the winding of said relay, No. 1 back contacts of relay TBL, No. 5 back contacts of relay Z, No. 3 back contacts of relay KD, conductor 56, back contacts of relay RL5, No. 2 back contacts of relay RL4, No. 3 back contacts of relay RL3, No. 2 front contacts of relay RL2, and front contacts of relay RL1 to ground.

When relay PTC operates, as described above, its front contacts connect ground to the lower winding of the polarized relay PTO and its back contacts remove the short-circuit around the capacitor CN through resistor RS. Said capacitor then charges from battery through the upper winding of relay PTO and to ground through resistor RS. The charging current through the upper winding of relay PTO holds the armature of said relay for a time against its right-hand contact, but, as said capacitor charges, the charging current decreases and the armature of relay PTO is moved to its left-hand contact by the current from battery through the lower winding of said relay and front contacts of relay PTC to ground.

When relay PTO closes its left-hand contacts, if relay CK has not then operated, relay TBL operates over a circuit extending from battery through the winding of said relay, No. 2 contacts of relay CK and left-hand contacts of relay PTO to ground. The No. 1 contacts of relay TBL open the circuit of relay CK, preventing belated operation of the latter relay. However, if relay CK has operated when relay PTO closes its left-hand contacts, the No. 2 contacts of relay CK open the circuit of and prevent the operation of relay TBL. The delayed operation of relay PTO gives time for the punch magnets and relays to operate.

Operation of relay CK, as described above, opens the circuits of and releases the operated punch magnets and their associated relays RL— which, in turn, release relay CK.

When ground is now removed, by any suitable means, from the combination of conductors 51— 55 and from conductor 50, magnet PAC and relay PTC release. By the release of magnet PAC, the feeler pin P is withdrawn from contact with the disc N by the spring S2. By the release of relay PTC, capacitor CN is once more short-circuited and discharged. The circuit of the lower winding of relay PTO is also opened and the armature of said relay moved to its right-hand contacts by current from battery through the upper winding of said relay and back contacts of relay PTC to ground. The front contacts of relay PTC also open the circuit of and release magnet PAM and relay PA. Relay Z operates over a circuit extending from battery through the winding and No. 1 normal contacts of said relay, No. 1 contacts of relay W, and back contacts of relay PA to ground, and locks up through its No. 1 front contacts, No. 1 contacts of relay ZD, and No. 2 contacts of relay W to ground. Relay W is held operated over a circuit extending from battery through the winding of said relay, No. 2 front contacts of relay Z, No. 1 contacts of relay W, and back contacts of relay PA to ground.

Upon the release of magnet PAM, the spring S, through the pawl PL, should advance the drum D to a position for impressing the next line in tape T. When a combination of the conductors 51—55 and conductor 50 are again grounded for the recording of this line, magnet PAC, relay PTC, a combination of the punch magnets M1— M5, and a combination of the relays RL1—RL5 are again operated, as described above.

Now, if the drum D has advanced, feeler pin P will enter a notch of disc N and close contacts C. Relay KD then operates over an obvious circuit and locks up through its No. 1 contacts and front contacts of relay PTC to ground. If two and only two of magnets M1—M5 are energized and their associated relays thereby operated, the circuit of relay CK is completed. For example, if magnets M1 and M3 are energized and relays RL1 and RL3 are operated, relay CK operates over a circuit extending from battery through the winding of said relay, No. 1 back contacts of relay TBL, No. 5 front contacts of relay Z, No. 3 front contacts of relay KD, conductor 56, back contacts of relay RL5, No. 2 back contacts of relay RL4, No. 2 front contacts of relay RL3, No. 2 back contacts of relay RL2, and front contacts of relay RL1 to ground. The operated punch magnets and their associated relays are thereby released and drum D advanced as previously described. Relay PTO also operates in the manner described above.

If more or less than two of the punch magnets M1—M5 are energized and their associated relays operated, the circuit of relay CK is not completed and, when relay PTO closes its left-hand contacts, relay TBL operates as described above. But even though exactly two of relays RL1—RL5 are operated, if the drum D has failed to move from its position when the previous line was recorded on tape T, the feeler pin P, when drawn down by magnet PAC, strikes the periphery of the disc N and contacts C are not closed. The circuit of relay KD is not then closed and said relay does not operate. The circuit of relay CK is not then completed since relay Z is operated, and relay CK does not operate. When relay PTO then closes its left-hand contacts, relay TBL operates, as described above. In operating, relay TBL actuates the alarm AL, which may be of any suitable type, by applying ground through its No. 2 contacts to said alarm. It should be noted also that if relay TBL operates, relay CK cannot thereafter operate. The operated punch magnets are then not released. Relay PTC and magnet PAC are held operated even though ground is removed from conductor 50, over a circuit extending from battery through the winding of said relay and magnet and No. 3 contacts of relay TBL to ground. With relay PTC and magnet PAM held operated, the drum D does not advance.

Assuming, however, that the operation of the recorder was correct and that, therefore, relays KD and CK did operate, as described above, then the punch magnets, their associated relays and relay CK are released, as previously described, and, upon the removal of ground from conductor 50, magnet PAC and relay PTC are released. The release of relay PTC releases relay PA and the paper advance magnet PAM. When relay PA operated, the circuit of relay W was thereby opened and said latter relay released, relay Z being held operated over a circuit extending from battery through the winding and No. 1 front contacts of said relay, No. 1 contacts of relay ZD, and front contacts of relay PA to ground. Now, when relay PA releases, this latter circuit is opened and relay Z thereby released. Release of relay PTC releases relay KD. The circuits are now in their original condition and the operations described above are repeated in connection with the recording of succeeding lines on tape T.

However, when magnet PAC is again operated, if the drum D has failed to move from its position when recording the previous line, the feeler pin P again falls into a notch in the disc N, closing contacts C and thereby operating relay KD. The circuit of relay CK is then not completed, being open at No. 3 back contacts of relay KD.

Upon the operation of relay PTO, relay TBL then operates, actuating the alarm AL to indicate the malfunctioning of the recorder and arresting further action thereof, as described above.

Thus, each time the recorder is actuated to record a line on tape T, the position of the record as indicated by the position of drum D and the number of punch magnets energized are checked to insure that the line is correctly recorded. If this check indicates correct functioning of the recorder, the operation thereof is permitted to proceed, but if the check indicates that the operation of the recorder is defective in either or both of the functions checked, further operations of the recorder are arrested and an alarm is actuated to give notice of malfunction.

After a failure of the drum D to step, if the recorder is released and its operation resumed, the positions of the notches in the disc N would be incorrect with respect to the operations of relays Z and KD in connection with subsequent recording operations. That is, the feeler pin P when drawn down by magnet PAC would enter a notch of disc N and operate relay KD when relay Z is not operated and would strike the periphery of disc N and fail to operate relay KD when relay Z is operated. In either case, false indications of malfunctioning would be given. The recorder should be released, therefore, after a failure of drum D to step normally, by operating the key K. If, when said key is operated, relay KD is not operated but relay Z is operated, relay ZD operates over a circuit extending from battery through the winding of said relay, No. 3 front contacts of relay Z, No. 2 back contacts of relay KD, and contacts of key K to ground, and locks up through its No. 2 contacts and No. 2 contacts of relay TBL to ground. The No. 1 contacts of relay ZD open the circuit of and release relay Z. Or, if when key K is operated, relay KD is operated and relay Z is not operated, upon operation of key K, relay ZU operates over a circuit extending from battery through the winding of said relay, No. 4 back contacts of relay Z, No. 2 front contacts of relay KD, and contacts of key K to ground, and locks up through its No. 2 contacts and No. 2 contacts of relay TBL to ground. The No. 1 contacts of relay ZU complete the circuit of relay Z from battery through the winding and No. 1 normal contacts of relay Z, No. 1 contacts of relay W (said relay being operated, as previously described), and No. 1 contacts of relay ZU to ground. In either case, the sequence of operations of relays Z and KD is changed to agree with the positions of the notches in disc N. Also, by the operation of key K, the circuit of relay CK is completed and said relay thereby operated, as follows:

If, when key K is operated relay KD is not operated and relay Z is operated, relay Z releases, as described above. Then relay CK operates over a circuit extending from battery through the winding of said relay, No. 1 front contacts of relay TBL, No. 3 back contacts of relay Z, No. 2 back conacts of relay KD, and contacts of key K to ground. Or, if when key K is operated, relay KD is operated and relay Z is not operated, relay Z operates, as described above. Relay CK then operates over a circuit extending from battery through the winding of said relay, No. 1 front contacts of relay TBL, No. 4 front contacts of relay Z, No. 2 front contacts of relay KD, and contacts of key K to ground. Operation of relay CK opens the circuit of and releases relay TBL and the operated punch magnets as described above. When ground is then removed from conductor 50, relay PTC releases, releasing, in turn, the paper advance magnet PAM. The recorder is now ready to resume recording operations and the circuits will operate normally to check the operations of the recorder.

While we have illustrated our invention by one embodiment thereof, it is not limited to the particular arrangements herein disclosed. It is obvious, for example, that the notches in the disc N may be formed in the drum D rather than in a separate disc or may be replaced by holes or depressions in said drum. While only five punch magnets MI—M5 are shown, the invention may be applied to recorders which have more or less than five punch magnets. Various other modifications and adaptations of the invention will be apparent to those skilled in the art. The terms and expressions which we have used in reference to this invention are used as terms of description and not of limitation and we have no intention in the use of such terms and expressions of excluding equivalents or modifications of the features shown and described or portions thereof, but, on the contrary, intend to include therein any and all equivalents and modifications which may be employed without departing from the spirit of the invention.

What is claimed is:

1. A circuit for checking the advance of a movable member having a plurality of stopping positions, comprising two relays, means for operating both of said relays on alternate ones of said positions, and circuit means including another relay rendered effective by said two relays when both are normal or both are operated for indicating the advance of said member one position.

2. A circuit for checking the advance of a movable member having a plurality of stopping positions, comprising two relays, means for operating both of said relays on alternate ones of said positions, circuit means including another relay rendered effective by said two relays when both are normal or both are operated for controlling the advance of said member one position and means responsive to one of said relays when normal while the other of said relays is operated for indicating failure of said member to advance one position.

3. In a recording device provided with a movable record-feeding member having a plurality of recording positions, a circuit for checking the advance of said member from one recording position to the next recording position, comprising two relays, means for operating both of said relays on alternate ones of said recording positions, and means operative over the contacts of said two relays when both are normal or both are operated for indicating the advance of said member one recording position.

4. A recording device comprising in combination with a movable record-feeding member having a plurality of recording positions, said member being provided with a depression for each alternate one of said positions and a crest for each one of the remainder of said positions, a feeler pin coacting with said depressions, a first relay responsive to said feeler pin when engaging a depression, a second relay responsive to the advance of said member from a recording position marked by a crest to the succeeding recording position marked by a depression, and a circuit including a relay completed through normal contacts on both of said first and second relays when normal or through operated contacts on both of said relays when operated for controlling the movement of said member.

5. A circuit for checking the advance of a movable member having a plurality of stopping positions, a portion of said member having a depression at every alternate stopping position and a feeler pin coacting with said depressions, comprising a first relay operated on the advance of said member to a position marked by a depression, a second relay operated by said feeler pin when engaging a depression, and a third relay operatively responsive to said first and second relays when both are normal or both are operated for indicating the advance of said member one position.

6. A circuit for checking the advance of a movable member having a plurality of stopping positions, a portion of said member having a depression at every alternate stopping position and a feeler pin coacting with said depressions, comprising a pair of counting relays, one of said counting relays being operated in a position of said member having no depression and the other of said counting relays being operated on the movement of said member to the next position marked by a depression, the first of said counting relays being released on the advance of said member to the next position marked by no depression and the second of said counting relays being released on the advance of said member to the next position marked by a depression, a third relay operatively responsive to said feeler pin engaging a depression, and a fourth relay operatively responsive to said second counting relay and said third relay when both of said last-mentioned relays are normal or both are operated for indicating the advance of said member one position.

7. A circuit for checking the advance of a movable member according to claim 6, including a fifth relay and a sixth relay, and means operable over said third relay when normal and said second counting relay when operated for operating said fifth relay to release said second counting relay thereby to establish coincident released condition of said third relay and said second counting relay, and operable over said third relay when operated and said second counting relay when released for operating said sixth relay to operate said second counting relay thereby to establish coincident operated conditions of said third relay and second counting relay.

WALTER P. ALBERT.
HAROLD W. GOFF.

REFERENCES CITED

The following references are of record in the file of this patent:

UNITED STATES PATENTS

| Number | Name | Date |
|---|---|---|
| 1,945,666 | Stewart | Feb. 6, 1934 |
| 2,142,880 | Anderson et al. | Jan. 3, 1939 |
| 2,161,273 | Begun | June 6, 1939 |
| 2,410,521 | Potts | Nov. 5, 1946 |
| 2,471,126 | Spencer et al. | May 24, 1949 |